H. DIXSON
Jan. 17, 1933. PLASTER CHANNEL INSTALLATION FOR SCREEN GUIDES Re. 18,716
Original Filed Jan. 16, 1928
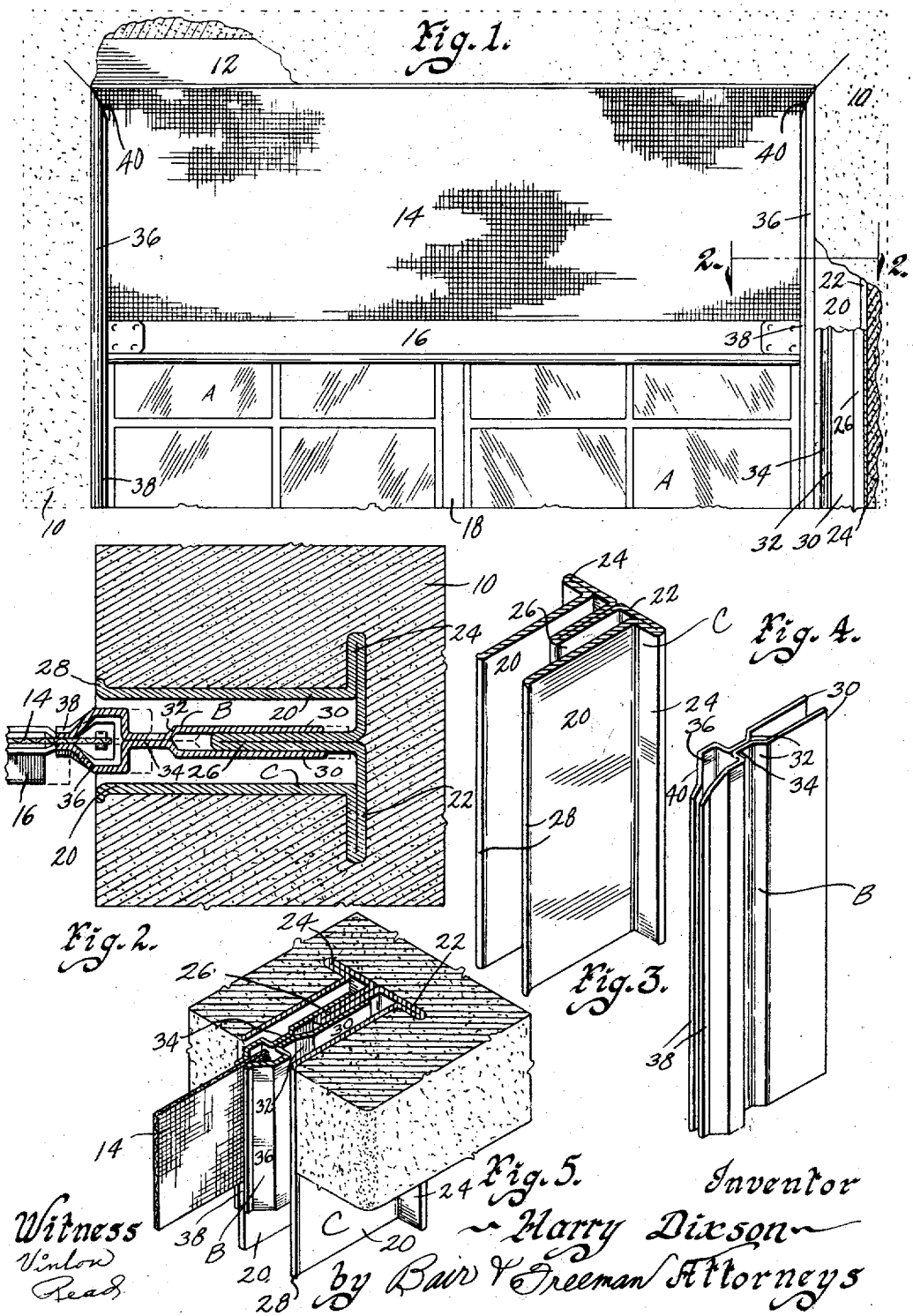

Reissued Jan. 17, 1933 Re. 18,716

UNITED STATES PATENT OFFICE

HARRY DIXSON, OF PELLA, IOWA, ASSIGNOR TO ROLSCREEN COMPANY, OF PELLA, IOWA

PLASTER-CHANNEL INSTALLATION FOR SCREEN GUIDES

Original No. 1,736,432, dated November 19, 1929, Serial No. 247,172, filed January 16, 1928. Application for reissue filed January 20, 1931. Serial No. 509,982.

The object of my invention is to provide a plaster channel installation wherein screen guides may be mounted for movement towards or from the plaster wall in which the channel member is embedded.

More particularly it is my object to provide a guide having an attaching flange frictionally engaged with the plaster channel member wherein the guide may move towards or from the plaster channel member for either initial adjustment of the guide relative to the channel or for further adjustment in case of expansion or contraction of the building in which the channel members are mounted or for any other reason which necessitates adjustment of the channel member relative to the guide member and for enabling the guide member to be removed entirely when desired.

A further object is to provide a screen guide or screen application device having an attaching flange in the form of a channel-shaped member adapted to frictionally engage and grip a flange-like element permanently mounted and forming a part of the permanent building construction adjacent a window opening.

Still a further object is to provide a device comprising a member having a U-shaped portion adapted to grip a flange forming a part of the window construction and having a channel-shaped member adapted to form a seat for a screen edge, the screen edge being frictionally held within its channel-shaped seat.

Still a further object is to provide members formed of sheet metal having channel portions for embracing flange portions mounted on the side jambs of a window opening and having channel portions for receiving opposite edges of the screen which is adapted to extend across the window opening for screening the same.

A further object is to provide retaining members or screen guides which are folded or rolled from strips of resilient sheet metal into a screen guide portion and a channel-shaped portion opening in a direction reversely to the screen guide portion for providing a flange clamping member.

Still another object is to provide a screen application device or a retaining member for use with a flanged element permanently mounted upon a window jamb, including a member formed of a strip of resilient sheet metal for providing a continuously extending guide channel into which a screen edge is adapted to be received and retained, said sheet metal also providing an oppositely opening continuous channel adapted to receive and frictionally clamp the flange element mounted on the window jamb.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side view of a portion of a wall with a window opening formed therein and my improved plaster channel installation members shown therein, parts being broken away and shown in section to better illustrate the construction.

Figure 2 is a central sectional view taken on the line 2—2 of Figure 1 showing the installation complete and substantially enlarged.

Figure 3 is a sectional perspective view of the plaster channel member which is adapted to be embedded in the plastic material of the building.

Figure 4 is a perspective view of the guide or track; and

Figure 5 is a sectional perspective view showing the guide channel member and screen in their relationship to the plaster wall in which the channel is embedded.

In the accompanying drawing I have used the reference character A to indicate generally a window opening formed in a wall 10. The wall 10 is covered with plastic material.

Within a recessed opening formed in the upper portion of the window opening, I place a screen box or casing 12 adapted to conceal a window screen 14 which the same is in rolled-up position. Upon the lower edge of the screen 14 I provide a binder 16 of relatively stiff material. Within the window opening A is mounted a steel casement window frame of any suitable kind and construction.

It is desirable to provide means for mounting guides upon the two sides of the window opening wherein the side edges of the screen 14 together with the outer ends of the binder 16 may be received and guided and for this purpose I provide guides or tracks B of substantially the shape and construction illustrated in Figure 4 of the drawing.

The position or distance between the two guides B is adapted to be set or fixed by means of the binder 16. Any variation in distance between the two sides of the window opening A is compensated for by mounting the guides or tracks B in such a manner as to allow their adjustment towards or from each other and this is accomplished in the manner which I will now describe in detail.

Within the plastic material forming the wall 10, I embed a plaster channel member C. The plaster channel member C is formed of a single piece of material adapted to provide a pair of sides 20 and a back or bottom wall 22. The wall 22 is formed by outturning the inner edge of the walls 20 and then rebending them so as to provide outturned flanges 24 adjacent the walls 20.

Between the walls 20 and formed of the back material 22, I provide a track receiving flange 26. The track receiving flange 26 is formed by redoubling the material of the back 22 and inserting it or projecting it in between the two walls 20. The track receiving flange 26 is permanently mounted as a part of the building structure or construction, and serves as a means whereby the screen edge receiving device may be clamped or frictionally held in position along each jamb of the window opening. The track receiving flange 26 extends from the header of the window opening to the sill thereof and is continuous.

The entire plaster channel member C is adapted to be embedded in the plastic material of the wall 10 and the position thereof is clearly shown in Figure 2 of the drawing. The flanges 24 provide the recess anchor means for retaining the channel member C in proper position in its plastic material.

The outer edges of the walls 20 are rolled or outturned as at 28 so as to provide a neat curved edge which is arranged to be substantially flush with the outer wall of the plastic material. It follows that when the plaster channel member C is embedded in the plastic material, a channel or groove is provided within the plastic material for receiving the guide or track B.

The guide or track B shown in the accompanying drawing, is formed of a pair of similar sheets of material which are rolled or otherwise formed to provide a pair of spaced flanges 30.

The flanges 30 may be properly termed "fastening flanges". The two pieces of material are brought together or inturned as at 32 for providing abutting surfaces 34. The abutting surfaces 34 are preferably spot-welded or otherwise fastened together. The "fastening flanges" are in reality channel-shaped and fit over the flange 26 which is permanently mounted as hereinbefore set forth. The channel portion or U-shaped portion which forms the fastening flanges of the guide or track B are such as to permit their engaging or embracing frictionally the track receiving flange 26.

Upon the free edge of the abutting surfaces 34 are provided outturned channel shaped parts 36 which form a guide for receiving the outer edge of the screen 14. The extreme outer edges of the portions 36 are provided with flat spaced flanges 38 between which is received the screen 14. The outturned channel-shaped parts 36 which form a guide receive the side edges of the screen 14. It will be noted that the "fastening flanges" open oppositely or in a reverse direction from the channel-shaped parts which form the screen guide and receive the side edges of the screen.

It will be noted further that the member B serves as the retaining or application device for mounting the screen across the window opening, the side edges of the screen being received in the channel-shaped portions formed by the parts 36 and flanges 30 gripping or embracing the permanently mounted flange 26 forming a part of the building construction, and on each jamb of the window opening.

The extreme upper ends of the guides B are inclined or cut-away as at 40 so that when the screen 14 for any unforeseen reason is pulled from its guides, the screen may pass up over the cut-away portions 40 into the casing 12 and then when the screen is again withdrawn the edges thereof will be received within the guide portions 36 of the track B.

The flanges 26 of the channel member C, after the plaster in which the channel member has been embedded is set, are designed to have the two flanges of the track thereover. The flanges 30 and 26 frictionally coact with each other for retaining the guide member properly positioned relative to the channel member C.

When the track B is mounted upon the plaster channel member C it assumes the position as shown in Figures 2 and 5 of the drawing. The fastening flanges 30 are spaced a sufficient distance apart so that the member 26 when inserted between the flanges 30 will have the coacting surfaces frictionally contact with each other to the end that the guide or track B is frictionally mounted upon and within the plaster channel member C.

The guides or tracks B are thus mounted for adjustment towards or from the plaster channel member C. One position of the track B is shown in dotted lines in Figure 2 of the drawing and another position is shown by solid lines.

The frictional contact between the track B and channel member C is such that when the parts assume a position, the particular position will remain unless something is done to positively readjust such position.

It will be noted that the entire track may be completely withdrawn when it is desired to paint the interior of the building and that the portion 26 of the plaster channel is sufficiently guarded by being projected a sufficient distance from the mouth of the channel member C as to preclude any paint from coming in contact therewith and thus possibly interfering with the easy operation of the track relative to the plaster channel member C.

When it is desired to entirely remove the guides and the screen, this can be done and the plaster channel member C left in the plaster of the wall and only a narrow slit opening is visible thus providing a neat way for mounting a screen guide in plaster.

Some changes may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:—

1. In combination with a screen guide for roll screens, a plaster channel installation for said guide comprising side walls and a bottom wall, a guide receiving flange extending from said bottom wall, said guide having a channel shaped portion coacting with said flange whereby an adjustable joint results.

2. In a device of the class described, a channel member having spaced side walls adapted to be embedded in a plastic wall, a screen guide adapted to be partially received in the channel member between said side walls and coacting parts on the channel member and the guide for forming an adjustable joint, said coacting parts being concealed by the channel member and spaced from the side walls thereof.

3. In a roll screen structure, a guide for the edge of the screen, a channel for receiving said guide, said channel being provided with side walls and a bottom wall connecting said side walls and extending beyond them for anchorage in a plastic wall, a flange on said bottom wall and positioned between said side walls, said guide being provided with a channel portion adapted to fit over and frictionally engage said flange.

4. An installation of the character disclosed comprising a channel member, a flange therein, a guide for a roll screen comprising an enlarged guide portion having a slit opening along one side thereof and a channel shaped extension on the other side thereof for coacting with and frictionally engaging said flange.

5. An installation of the character disclosed comprising a channel member, a flange therein, a guide for a roll screen comprising an enlarged guide portion having a slit opening along one side thereof and a channel shaped extension on the other side thereof for coacting with and frictionally engaging said flange with the enlarged portion partially entering the channel member between the side walls thereof.

6. In combination with a screen guide for roll screens, a plaster channel installation for said guide comprising side walls and a bottom wall, a guide receiving flange extending from said bottom wall and extending between said side walls, said guide having a means adapted to receive said flange.

7. In combination with a screen guide for roll screens, a plaster channel installation for said guide comprising side walls and a bottom wall, anchoring means on said channel to retain it embedded in a plastic wall, a guide receiving flange extending from said bottom wall towards the mouth of said channel, said guide having a means adapted to coact with said flange for forming an adjustable joint.

8. In combination with a screen guide for roll screens, a plaster channel installation for said guide comprising a channel member, a guide receiving flange mounted within said channel member, said guide having a portion to receive said flange.

9. A screen mounting for windows having a frame provided with flange portions at opposite edges of the window opening extending toward each other; comprising members having channel portions embracing said flange portions and channel portions for receiving opposite edges of the screen.

10. A mounting for securing a screen to a window comprising members having channels for receiving opposite edges of the screen and having clip means for embracing portions of the window frame, and means for retaining the screen in operative relation to said channels.

Executed at Pella, in the county of Marion and State of Iowa, this 17th day of January, 1931.

HARRY DIXSON.